(12) United States Patent
Cruver

(10) Patent No.: US 7,711,755 B2
(45) Date of Patent: May 4, 2010

(54) DYNAMIC XSD ENUMERATION

(75) Inventor: Donald Cruver, Wallkill, NY (US)

(73) Assignee: Topcoder, Inc., Glastonbury, CT (US)

( * ) Notice: Subject to any disclaimer, the term of this patent is extended or adjusted under 35 U.S.C. 154(b) by 418 days.

(21) Appl. No.: 11/749,333

(22) Filed: May 16, 2007

(65) Prior Publication Data

US 2007/0294282 A1 Dec. 20, 2007

Related U.S. Application Data

(60) Provisional application No. 60/801,565, filed on May 17, 2006.

(51) Int. Cl.
*G06F 7/00* (2006.01)
(52) U.S. Cl. .............. 707/803; 707/791; 707/796; 707/807
(58) Field of Classification Search ............. 707/1, 707/2, 3, 10, 100, 104.1, 999.001, 999.002, 707/999.003, 999.1, 999.102; 715/234
See application file for complete search history.

(56) References Cited

U.S. PATENT DOCUMENTS

| | | | |
|---|---|---|---|
| 6,826,568 B2 | 11/2004 | Bernstein et al. | |
| 7,089,491 B2 | 8/2006 | Feinberg et al. | |
| 7,093,200 B2 | 8/2006 | Schreiber et al. | |
| 7,096,224 B2 | 8/2006 | Murthy et al. | |
| 7,146,422 B1 * | 12/2006 | Marlatt et al. | 709/227 |
| 7,228,312 B2 | 6/2007 | Chaudhuri et al. | |
| 7,318,063 B2 | 1/2008 | Brychell et al. | |
| 7,444,330 B2 | 10/2008 | Bernstein et al. | |
| 7,467,147 B2 | 12/2008 | Irish | |
| 7,475,093 B2 * | 1/2009 | Tomic et al. | 707/200 |
| 7,496,599 B2 | 2/2009 | Brundage | |
| 7,542,982 B2 | 6/2009 | Kalia et al. | |
| 2004/0268234 A1 | 12/2004 | Sampathkumar et al. | |
| 2006/0230075 A1 | 10/2006 | Greef et al. | |

OTHER PUBLICATIONS

Kiran Masapari, "Framework for Integrating Sorcer with RPC-Style Web Services" Texas Tech University, Sep. 5, 2006. Downloaded from <http://dspace.lib.ttu.edu/handle/2346/1374?show=full>.
Sandeep Jandhyala, "An Automated XPATH to SQL Transformation Methodology for XML Data," Georgia State University, Dec. 2, 2005. Downloaded from <http://etd.gsu.edu/theses/available/etd-04012006-121218/>.

* cited by examiner

*Primary Examiner*—Hung Q Pham
(74) *Attorney, Agent, or Firm*—Goodwin Procter LLP

(57) ABSTRACT

In general, in one aspect, a method for dynamic markup language schema enumeration includes receiving a request for schema file data, the schema file data for validating markup language data, using a database query to retrieve from a database values in a database table that are valid values for the markup language data, and dynamically generating schema file data comprising markup language data structures generated in response to the retrieved database table values, the markup language data structures comprising the results of the database query.

10 Claims, 2 Drawing Sheets

DYNAMIC XSD ENUMERATION

RELATED APPLICATIONS

This application claims priority to, and the benefit of, U.S. Provisional Patent Application Ser. No. 60/801,565, filed May 17, 2006, entitled DYNAMIC XSD ENUMERATION.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

This application includes an Appendix of a computer program listing submitted along with this application, and that is hereby incorporated by reference, in the file named "dynamic_xsd_enumeration.txt" created on May 9, 2007, and of size 117 KB.

FIELD

The invention relates to XML-based software, and more particularly to XML-based software that interfaces with database data.

BACKGROUND

An XML Schema Definition (XSD) is an instance of an Extensible Markup Language (XML) schema written in the W3C's XML Schema language. An XSD defines a type of XML document in terms of constraints upon what elements and attributes may appear, their relationship to each other, what types of data may be in them, and other things. It can be used with validation software in order to validate that an XML document falls within the constraints. XSDs were the first W3C-recommended XML schemas to provide a namespace- and datatype-aware alternative to using XML's native Document Type Definitions (DTDs). XML Schema Definition files usually have the filename extension ".xsd".

Many different technologies use XML, and so benefit from the ability to validate XML using XSD's. For example, web services and web sites may use XML, and so can make use of XSDs.

SUMMARY

In the development of applications using XML technologies, it is sometimes the case that such technologies will operate on data that is stored in a database. In this case, data stored in one or more structures of the database (e.g., persistent tables, views, etc.) may determine the range of values that are appropriate (e.g., valid) for the XML data. Thus, the data in a column of a database may determine the data that should be included in an XSD file for validating certain data elements.

For example, each of the values in a column of a database table also may be valid values for elements of an XML document that describes data to be communicated to or from the database, or otherwise used in an application. In such a case, adding a new value to the values in the database involves both adding a new value to the database table and also updating the relevant XSD file(s). Making changes manually in two places is time-consuming, and may result in inconsistency.

In some implementations of XML-based software that interfaces with a database, a configurable, dynamic, XML Schema Definition (XSD) enumeration software module may dynamically retrieve a list of values from a database and make them available in an XSD enumerated list in XSD file data. The XSD file data may be provided in a servlet, such that it can be provided dynamically for use in validating XML data.

In one embodiment, a target XSD namespace and/or SQL queries specific to a database and/or database table are defined. For example, in one embodiment, the target XSD namespace may be specified as a configuration parameter. In another embodiment, the target XSD namespace may be specified as part of a document template. The SQL queries may be defined such that queries associated with different database tables or different databases (stored, for example, on different servers, in different instances, and/or in different physical locations) may be used. In some cases, the configuration information may also include database connection information, which may allow communication with different types databases, such as those offered commercially by ORACLE, MICROSOFT, and MYSQL.

In one embodiment, web-based software (e.g., a servlet or cgi script) receives a request for XSD file data. For example, the request may be for use in validating XML data as part of an application. In response to the request, the software performs one or more predefined database queries. For example, the software my submit one or more defined SQL queries to a database. The database table values received in response to the request may include the values that are valid for certain XML data. For example, the database request may be a SQL query for each of a number of elements in the column of a database table, or elements that span multiple columns and/or tables.

The XSD Namespace, database query and/or database connection information may be pre-configured, and/or provided in the request, instead of, or to override, predefined configuration values, and may in some cases be shared among numerous requests.

In one embodiment the software generates XML data structures in response to the enumeration values. In one embodiment, the XML data structures are provided in the specified XML namespace. In one embodiment, the XML data structures in the determined XML namespace are used to generate XSD file data. For example, XSD file data that includes the XML data structures in the defined XML namespace may be provided in response to the request. The XML data structures may be simpleType structures.

In one embodiment, the XML schema definition document is cached, so that it does not need to be regenerated to respond the same query. In one embodiment, the cache may be refreshed if new values have been added to the database. For example, the database may send a notification if the relevant database table data is changed. A user may also send a notification, for example manually or using a script when database table values are changed.

In general, in another aspect, a system for dynamic XSD enumeration includes a receiver for receiving a web request for XSD file data, the XSD file data for validating XML data, a cache determination subsystem for determining whether the XSD file data is contained in a cache, a database query system for using a defined database query to retrieve from a database values in a column of a database table if the XSD file data is not contained in the cache, an XML structure generator for generating XML structures in response to the retrieved database table values, an XSD generator for generating XSD file data comprising the generated XML structures; a caching subsystem for caching the XSD file data; and a transmitter for providing the cached document in response to the request.

In general, in another aspect, a method for dynamic XSD enumeration, includes receiving a web request for XML schema definition data, the XML schema definition data for validating XML data for use with a web application, web service, and so forth, using a database query to retrieve from a database values in a database table that are valid values for the XML data, dynamically generating XSD file data comprising XML structures generated in response to the retrieved database table values, the XML structures comprising the results of the database query, and providing the XSD file data in response to the request. In some embodiments, the method is performed each time that a client requires the XML schema data, such that the most current schema data is provided. In some embodiments, the XML schema data is cached, and the cache is updated upon time intervals, and/or upon a change to the database. In some embodiments, the database contains actual data values, and the method assumes that the values already in the database (for example at a particular column) are valid values, and so will provide a list of the values in the database as an enumerated list, so that the XML may be validated against the values already in the database.

DESCRIPTION

Figure 1:
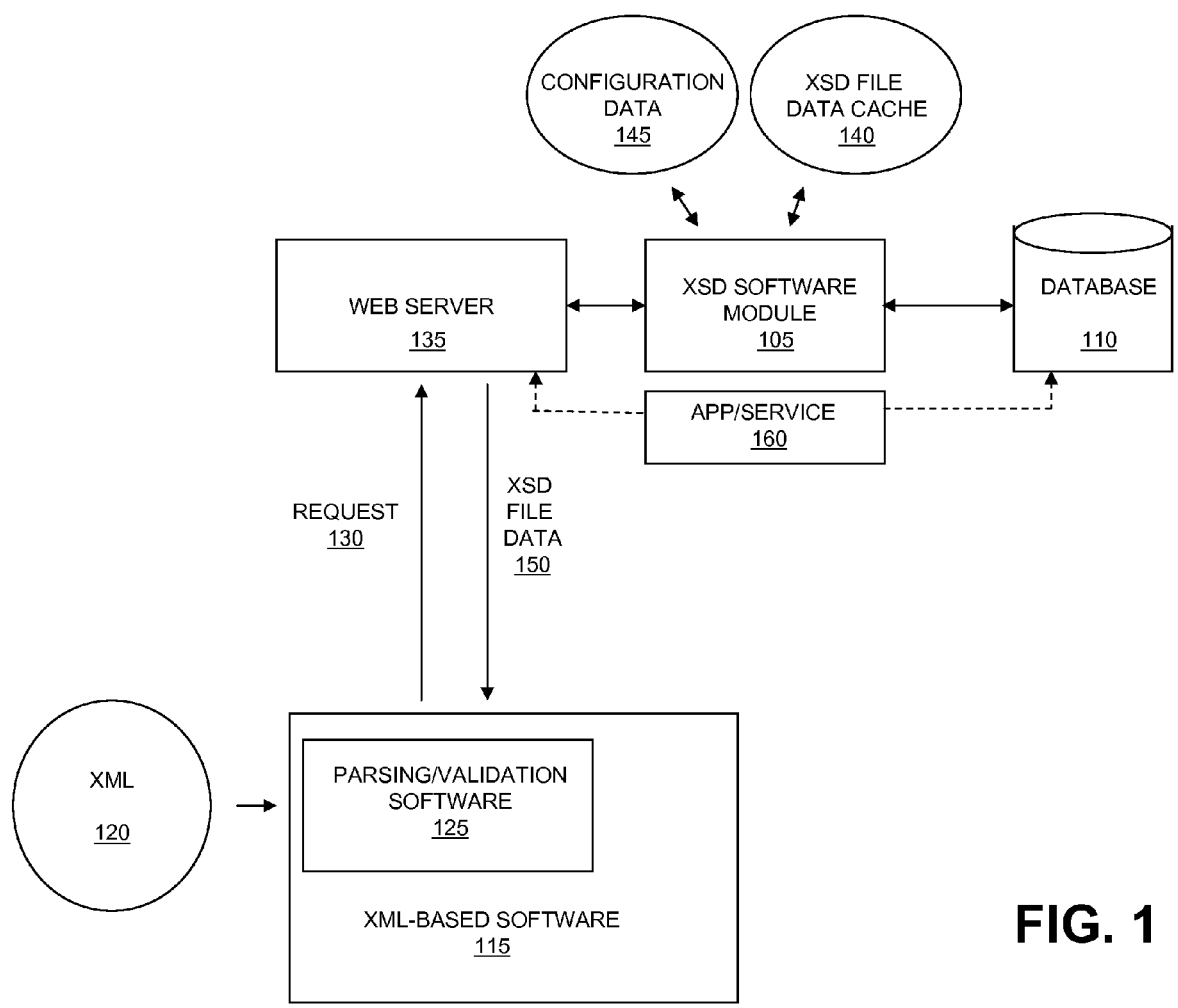
FIG. 1 is a block diagram of an embodiment of the invention.

Referring to FIG. 1, in one exemplary embodiment, a XSD software module 105 facilitates easy access to database 110 data for the development and/or operation of XML-based software 115. The XML-based software 115 may be any sort of software that uses XML, including software implementing web services, web software, software implementing a communications protocol, and so on. The XML-based software uses XML data 120. The XML data may be validated using validation software 125. The validation software 125 may be part of, or called by, an XML parser. The validation software 125 uses XSD file data to determine the validity of the XML data. The validation software may be any sort of software that is capable of parsing and/or validating XML data according to specifications in XSD file data.

To obtain XSD file data to validate the XML file, the validation software 125 makes a request 130 to a web server 135. The request to the web server 135 includes a reference or data indicative of the XSD software module 105, and so the request is passed from the web server 135 to the software module 105. The XSD software module 105 may be any sort of software that is capable of the functionality described here. In one embodiment, the software module 105 is a Java servlet. In another embodiment, the software module is a cgi script.

The web server 135 may be any sort of web server, such as those commercially available as INTERNET INFORMATION SERVICES from Microsoft Corporation, WEBSPHERE from IBM Corporation, and the APACHE WEB SERVER from the Apache Software Foundation. The web server 135 may provide an XML application or service 160 for communication with XML-based software 115. The web server 135, the XML application or service 160, or both, may communicate directly or indirectly with the database 110, for example, to provide database access to web services, the application or service 160, the web server 135 and/or the XML-based software 115.

The XSD software module 105, in turn, may determine whether the XSD file data is already available in an XSD file data cache 140. The cache 140 may be any sort of data store that can store XSD file data, such as memory, shared memory, disk file, and so on. If the XSD file data is not in the cache, the XSD software module 105 may make a request to the database 110 for the data values that are required for the XSD file data. The database request may be part of, or specified in the request from the validation software 125 to the web server 135. The database request may be specified or configured with the installation of the XSD software module 105, such that the XSD software module 105 uses a specific database request or requests upon receipt of the web request. The database request also may be specified at another time. The database request may be included in configuration data 145, which may include database queries relevant to the items disclosed in the XSD file data, as well as database connectivity configuration and/or a specification of the XSD namespace for the XSD file data.

The database may be any sort of database, or data storage system that will store data and respond to requests to store, modify, and retrieve data. Databases are available, for example, from such vendors as ORACLE CORPORATION, MICROSOFT CORPORATION, and MYSQL, INC., just to name a few. In a typical implementation, the data in the database 110 that is responsive to the request is not stored in the database for the purpose (or the sole purpose) of creating XSD file data. Rather, the data in the database 110 is data that is used in the operation of one or more applications. To take one example, the database may include a table (or tables) that includes attributes relating to a project. The database table from which a column will be used may have a number of entries all related to a information about the project. The database may be used in the application for a number of different purposes related to the operation of the project management application. In this example, the names of the projects are also the set of valid enumerated items that would be used in an XML file to communicate information about the project. In such case, it is beneficial to reuse the data in the database 110 to generate the XSD file data as described here, rather than maintain a separate copy of the XSD data, thereby minimizing the risk of data discrepancies.

In one embodiment, the XSD software module 105 uses the database data that is responsive to the request to dynamically generate the XSD file data to specify an enumerated list of values that are valid in an XML document. In this way, the data in the XSD file data can reflect the current state of the database 110. The XSD software module 105 may cache the XSD file data in the XSD file data cache 140, for future request responses. In this way, the software module will not need to make a request to the database for future requests.

The software module 105 via the web server 101 responds to the request 130 with XSD file data. The XSD file data may be in the form of one or more files. The response may be in the form of another link to further XSD file data. The response is used by the validation software 125 to validate the XML 120.

The software module 105 may automatically update the XSD file data in the cache 140 when relevant database values are changed. For example, a database trigger based on changes in the data values may notify the software module (e.g., via the web server 135, via a socket, and/or other interprocess communication) that the database has changed. There may be a manual mechanism for a user to notify the software module (e.g., via the web server 135, via a socket, and/or other inter-process communication) that the database has changed.

Thus, the XSD software module 105 may be a servlet that is dynamically accessible, such that current XSD file data is always available with the latest information from the database.

The XSD software module 105 may be implemented in any programming language, preferably an object-oriented language such as Java or C#. The software optionally may make use of none, one, some, or all of a Database Connection Factory, a Document Generator, a Result Set XML, and a Simple Cache, all commercially available from TopCoder. Inc. of Glastonbury, Conn. The software may run on a standard operating environment, such as Solaris 7, Red Hat Linux 7.1, Windows 2000, and Windows 2003, and use commercially available run-time environments and frameworks, such as JAVA and .NET.

As an example, TABLE 1 shows a set of XSD simpleTypes with enumerated values. The example of TABLE 1 shows an enumeration of the days of the week.

TABLE 1

EXAMPLE ENUMERATED VALUES IN XSD FILE DATA

```
<xsd:simpleType name="DaysOfWeek">
    <xsd:restriction base="xsd:string">
        <xsd:enumeration value="Sunday"/>
        <xsd:enumeration value="Monday"/>
        <xsd:enumeration value="Tuesday"/>
        <xsd:enumeration value="Wednesday"/>
        <xsd:enumeration value="Thursday"/>
        <xsd:enumeration value="Friday"/>
        <xsd:enumeration value="Saturday"/>
    </xsd:restriction>
</xsd:simpleType>
```

In one embodiment, a Document Generator software module (e.g., component) may be used to generate XSD file data. Such a software module is available from TopCoder, Inc. of Glastonbury, Conn. In one embodiment, the generated file data may include multiple simpleType declarations. In one embodiment, All simpleType elements in the generated document will be in the same namespace. In one embodiment, the XSD namespace may be specified as a configuration parameter.

In another embodiment, the XSD namespace may be specified as part of a document template. In some embodiments, a Document Generator component designed for the purpose of generating actual text document component encounters problems when processing XML-like data. Such a Document Generator, if not configured to work with XML-defined characters like '<' and '>' may encounter problems in working with documents with such characters. For example, a simple template that has no parameters such as "<test> This is a test template</test>" may cause the Document Generator to fail. Such a Document Generator component may need to be designed or redesigned to enable use in this context.

Each set of enumeration values may be retrieved from a database through a set of configurable database queries. For example, for an SQL database, there may be one or more SQL queries. Database connection information also may be configurable.

An example of an SQL database query is shown in TABLE 2. This query requests the list of values in the project name column of the projects data table.

TABLE 2

EXAMPLE SQL QUERY

```
SELECT project_name
    FROM projects
    WHERE project_status = 'Active'
    AND client = 'TopCoder'
```

TABLE 3 shows exemplary results of the query of TABLE 2. There are four projects in this exemplary database: TimeTracker, BugTracker, Asset Manager, and Conversion Project.

TABLE 3

RESULTS FROM THE QUERY OF TABLE 2

TimeTracker
BugTracker
Asset Manager
Conversion Project

The document generated by this software module may be URL-accessible (e.g., as a servlet) so that it can be included in statically-defined XSD documents and accessed remotely.

The software module may cache the generated document to prevent identical queries from being executed multiple times. It may delete the cache, so that it may be refreshed upon the next request, and/or refresh the cache, when new values are added to, changed, or deleted in the database. For example, the database may send a notification if the relevant database table data is changed. A user may also initiate a notification, for example manually or using a script when database table values are changed.

The following demonstrative example describes how the software module may be used to validate an XML document containing the names of open projects from a list of projects. The projects in this example list are: Base Formula Set, Calendar Tag, Custom Scoring Engine, DAO Selector, Data Grouping Tag, Data Mapper, and Excel Utility. In this example, project names change and are added weekly.

The static portion of the XSD is shown in TABLE 4. The namespace is specified in the statement: "xmlns:op="http://www.topcoder.com/openProjects." This statement indicates that the data that is available at the alias "op" can be found at the specified location.

TABLE 4

STATIC PORTION OF GENERATED XSD

```
<!-- Static Portion -->
<xsd:schema xmlns:xsd="http://www.w3.org/2001/XMLSchema"
        xmlns="http://www.topcoder.com"
        xmlns:op="http://www.topcoder.com/openProjects"
        op:schemaLocation="http://www.topcoder.com/openProjects
http://www.topcoder.com/dynamic/xsd/enumeration">
    <xsd:element name="OpenProject">
        <xsd:complexType>
            <xsd:sequence>
                <xsd:element  name="ProjectID"
                            type="xsd:positiveInteger"/>
                <xsd:element  name="ProjectName"
                            type="op:OpenProjectName"/>
            </xsd:sequence>
        </xsd:complexType>
    </xsd:element>
</xsd:schema>
```

To validate that the names of the open projects are valid, the software described above is used to dynamically generate the portion shown in TABLE 5.

TABLE 5

EXEMPLARY DYNAMICALLY GENERATED PORTION OF XSD

```
<!-- Dynamcially Generated Portion -->
<xsd:schema xmlns:xsd="http://www.w3.org/2001/XMLSchema"
        xmlns="http://www.topcoder.com/openProjects">
    <xsd:simpleType name="OpenProjectName">
        <xsd:restriction base="xsd:string">
            <xsd:enumeration value="Base Formula Set"/>
            <xsd:enumeration value="Calendar Tag"/>
            <xsd:enumeration value="Custom Scoring Engine"/>
            <xsd:enumeration value="DAO Selector"/>
            <xsd:enumeration value="Data Grouping Tag"/>
            <xsd:enumeration value="Data Mapper"/>
            <xsd:enumeration value="Excel Utility"/>
        </xsd:restriction>
    </xsd:simpleType>
</xsd:schema>
```

In this example, the static data in TABLE 4 would be in a separate file from the dynamic data shown in TABLE 5. The "schemaLocation" tag at the top of TABLE 4 is used in the XSD file data to tell the XML validation software where to find the data in TABLE 5. It also would be possible to have the static and the dynamic data in the same file, as shown in TABLE 6.

TABLE 6

STATIC AND DYNAMIC DATA COMBINED

```
<xsd:schema xmlns:xsd="http://www.w3.org/2001/XMLSchema"
        xmlns="http://www.topcoder.com">
    <xsd:simpleType name="OpenProjectName">
        <xsd:restriction base="xsd:string">
            <xsd:enumeration value="Base Formula Set"/>
            <xsd:enumeration value="Calendar Tag"/>
            <xsd:enumeration value="Custom Scoring Engine"/>
            <xsd:enumeration value="DAO Selector"/>
            <xsd:enumeration value="Data Grouping Tag"/>
            <xsd:enumeration value="Data Mapper"/>
            <xsd:enumeration value="Excel Utility"/>
        </xsd:restriction>
    </xsd:simpleType>
    <xsd:element name="OpenProject">
        <xsd:complexType>
            <xsd:sequence>
                <xsd:element name="ProjectID"
                            type="xsd:positiveInteger"/>
                <xsd:element name="ProjectName"
                            type="OpenProjectName"/>
            </xsd:sequence>
        </xsd:complexType>
    </xsd:element>
</xsd:schema>
```

Figure 2:
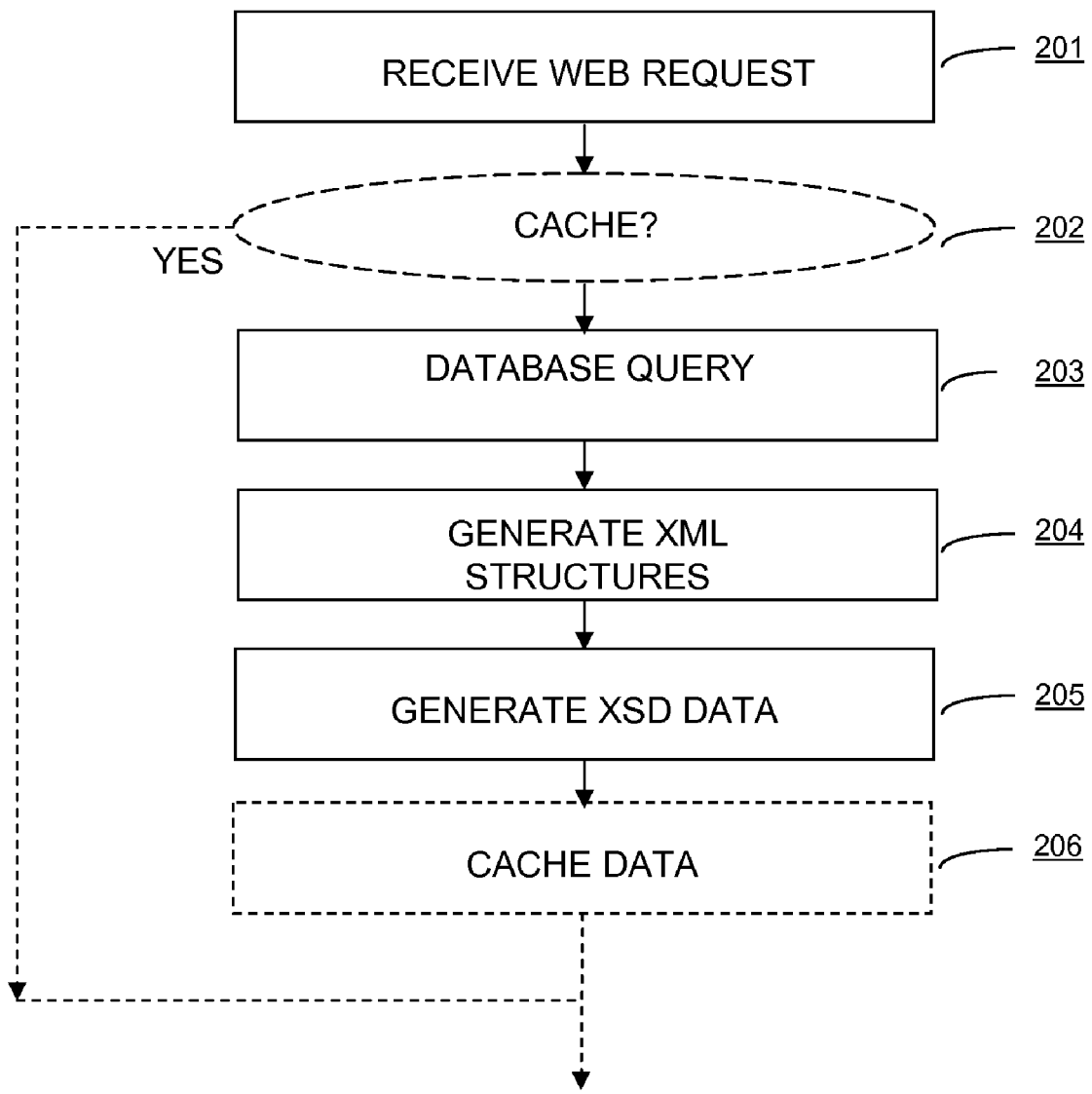
FIG. 2 is a flow chart of an embodiment of the invention.

Referring to FIG. 2, in some embodiments, a server receives a web request STEP 201 for XML schema definition information (e.g., an XSD file). The server may determine whether the schema definition information is found in a data store such as a cache STEP 202.

If the schema definition information is not in the data store or the schema definition information in the data store is not current and/or accurate, the server may execute a database query STEP 203 to obtain data from a database. The database query may be made in response to configuration information.

The schema definition information may be determined to be not current by any suitable mechanism. For example, the database sends a message to the server to indicate that a change to the database has been made. As another example, the schema definition information may be determined to be not current based on the date/time of the data in the data store and/or data in the database.

In response to the database query, the server may receive a response that includes database table data. The server may dynamically generate XML structures in response to the database table data STEP 204. For example, the structures may include an enumeration of database table values in a particular column. The structures may include an enumeration of database table values in a combination of fields.

The generated XML structures are used to generate XML schema definition information STEP 205. This may include combining static information with dynamically generated information such as the generated XML structures.

The XML schema definition information may be cached so that it is available for future requests STEP 206.

It should be understood that in various embodiments the server may or may not cache or otherwise store the XML schema definition information, and it is possible for the server to dynamically generate schema definition information each time that is requested. The storage of the XML structures may be in a data store that is local to the server, or may be in another accessible data store.

The functionality just described and attributed to a server may be implemented by a plug-in, script, applet, and so on, and may be implemented on any type of computer or device, or combination of computers and/or devices.

Exemplary Implementation

The exemplary software code in the Appendix on CD-ROM provides a demonstrative example of an implementation of an exemplary embodiment of the invention. The Appendix includes a file "dynamic_xsd_enumeration.txt" created on May 9, 2007, and of size 117 KB, which is a listing of the source code files for an exemplary implementation in a Java-based architecture. It should be understood that implementations in other languages (e.g., C++, C#), and or using other technologies (e.g., .Net, Websphere, BEA) are also possible.

In this exemplary embodiment, a software component is designed to read values from a database and dynamically generate the XML schemas. A template approach to defining a XSD may be more flexible, because it may allow a richer variety of XML Schemas to be generated.

In some embodiments, a template approach toward generating schema documents is supported by utilizing an XML Filler component, available from TopCoder, Inc., of Glastonbury, Conn. The template is provided as an XML skeleton document, and schema SimpleType enumerations are inserted as Filler elements inside the skeleton document to produce a schema.

In some embodiments, one of the steps involved in producing a Schema document is to produce SimpleType documents. This is implemented in the method buildSimpleType (simpleTypeConfig, fillerDocument). A fillerDocument that contains a <filler> element is expected initially. A child element to the <filler> element is created that has a name of "simpleType" and prefix as specified. A child element to the created <simpleType> element is created that has a name of "restriction", prefix as specified, and an attribute named "base" with the base value specified in the simpleTypeConfig. The list of enumeration values is retrieved from the EnumerationSource. For each Enumeration Value, a child element to the <restriction> element is created that has a name of "enumeration", prefix as specified, and an attribute named "value" with the value returned from EnumerationSource.

To produce a default skeleton document, the NamespaceDocumentConfig produces a default skeleton document in the case that a targetNamespace is used instead of an XML template. The text shown in TABLE 7, for example, may be used to serve as the Skeleton Document. It may be stored in the calss as text.

TABLE 7

TEXT TO SERVE AS SKELETON DOCUMENT

{<xsd:schema xmlns:xsd="http://www.w3.org/2001/XMLSchema\"
xmlns=" + targetNamespace + "><+
XmlFillerBuilder.FILLER_ELEMENT_NAME + /></xsd:schema>
}

The final document is generated by first producing the skeleton document, producing the filler document, and merging the skeleton and filler documents. Producing the skeleton document may be produced using the specified template by parsing the template String into an XML document. This document is expected to have a FILLER_ELEMENT_NAME child element within to determine where the simpleTypes are going to be placed. The filler document is produced by creating a new document with only one parent <filler> element. This may be done, for example, by retrieving each SimpleTypeConfig from the DocumentConfig and feeding it to buildSimpleType(simpleTypeConfig, fillerDoc) method. The filler document contains filler elements (and may contain all necessary filler elements) after this has been done. The skeleton and filler documents are then merged. This may be accomplished by using an XML filler component. The xpath used may be "//"+FILLER_ELEMENT-NAME, to denote that the element with FILLER_ELEMENT_NAME should be replaced by the data within the skeletal nodes.

This is demonstrated with the source code found in the appendix. In this exemplary implementation, four packages are built, "com.topcoder.xml.xsd.dynamic," "com.topcoder.xml.xsd.dynamic.servlet," "com.topcoder.xml.xsd.dynamic.enumsource," and "com.topcoder.xml.xsd.dynamic.builder." An overview of classes used in the exemplary implementation is found in TABLE 8, and a list of exceptions thrown is found in TABLE 9. In some implementations, thread safety is important, because one of the primary usage scenarios is within a web environment. EnumerationLoader, DynamicDocumentBuilder, and DynamicEnumerator implementations are designed to be thread safe. The Config classes are thread-safe by virtue of their immutability.

TABLE 8

EXEMPLARY IMPLEMENTATION CLASS OVERVIEW

[com.topcoder.xml.xsd.dynamic]

| | |
|---|---|
| DynamicEnumerator | This class serves to aggregate the different DocumentConfigs by identifier, and serves as the main point of access for the functionality of this component. It is responsible for generating and caching the different XML Schema documents, as well as managing the document configurations that are available. |
| DocumentConfig | This class holds the configuration for a dynamically generated XML Schema document. It is composed of a list of SimpleTypeConfigs, and a choice of a template, or a targetNamespace. The information in this class is used to dynamically build an XML Schema document with enumeration values retrieved from the EnumerationSource in the underlying SimplyTypeConfig. |
| SimpleTypeConfig | This class is used to encapsulate the information for the dynamic enumeration of an XML Schema SimpleType. The restrictionBase, and name of the simpleType element can be specified. It also contains an EnumerationSource which is used to dynamically generate the actual enumeration values to use in the simpleType definition. |

[com.topcoder.xml.xsd.dynamic.builder]

| | |
|---|---|
| DynamicDocumentBuilder [interface] | This is an interface that describes a Strategy for building an XML Schema document from a provided DocumentConfig. A documentConfig may contain a template text and targetNamespace. The implementations may differ in how the template text is utilized, or how a bare-bones XSD document is created. |
| XmlFillerBuilder | This is the default implementation of the DynamicDocumentBuilder interface. It utilizes a template in the form of an "XML Skeleton". The template should be a predefined XML-Schema, with a "filler" element that is used to specify where the generated simpleTypes need to be inserted. If no template is defined, then a "bare-bones" XML Schema document will be generated. |

[com.topcoder.xml.xsd.dynamic.enumsource]

| | |
|---|---|
| EnumerationSource [interface] | This is an interface that defines a Strategy for retrieving a set of values that may be used in an Enumeration. The set of Strings that are returned by implementations will be used to enumerate a set of valid values in the generated simpletype. |
| DBEnumerationSource | This is a database implementation of the EnumerationSource interface that retrieves data from a database using a preconfigured SQL query. This is commonly used to retrieve information from 'lookup-tables', which limit the values for a given field. |

[com.topcoder.xml.xsd.dynamic.servlet]

| | |
|---|---|
| | (This subpackage has been defined to separate Servlet functionality from the main package.) |
| XsdEnumerationServlet | This is a Servlet Class that is used to provide the functionality of the DynamicEnumerator to the web. This class will basically process the requests, determine the documentConfig that is being requested, and return the document conrresponding the the provided config. If no document can be generated for the requested URL, then a (404) Error message is returned. |

TABLE 8-continued

EXEMPLARY IMPLEMENTATION CLASS OVERVIEW

| | |
|---|---|
| EnumerationCacheRefreshServlet | This servlet is provided to provide remote cache refreshing services to the DynamicEnumeration. The dynamically generated XSD documents may be cleared of their current data, so that they may be updated with new values that have changed in the EnumerationSource. Once the cached document has been cleared, any succeeding requests for the XSD document will result in the XSD document being generated wth fresh values from the EnumerationSource. |

TABLE 9

EXEMPLARY IMPLEMENTATION EXCEPTIONS

| | |
|---|---|
| ServletException | This exception is thrown by the servlet classes when a problem occurs while processing an HTTP Request or in initialization. |
| IOException | This exception occurs when there is a problem with writing out the Servlet response, or when reading a template from a File. |
| IllegalArgumentException | This exception is thrown when null, empty String or otherwise invalid parameters are passed on to any of the methods in this component. Note that trimming of String is required for empty String checking. |
| EnumerationSourceException | This exception is thrown by implementations of EnumerationSource if an error occurs while they are retrieving enumeration information. |
| DocumentBuilderException | This exception is thrown by implementations of the DynamicDocumentBuilder if an error occurs while the document is being built. |
| InvalidTemplateException | This exception is thrown by implementations of the DynamicDocumentBuilder if the implementation does not recognize the template that is provided, or the template is in some other way invalid. |
| DynamicEnumeratorException | This exception will signify a problem when working with this component. |

In some embodiments, an exemplary implementation is written in Java 1.4. Other languages, are also possible. In some embodiments, use is made of components available from TopCoder, Inc., of Glastonbury, Conn. For example, a XML Filler 1.0 is used to support skeletal XML documents as templates for the generated documents; Simple Cache 2.0.1 is used to cache the generated documents; DB Connection Factory 1.0 is used to retrieve connections from the database for retrieving values; Base Exception 1.0 is used as the base class for all custom exceptions; and Object Fatory 2.0.1 is used for convenient configuration of the servlet.

The parameters used to configure XsdEnumerationServlet and EnumerationCacheRefreshServlet are provided in TABLE 10. Sample configuration parameters are shown in TABLE 11.

TABLE 10

EXEMPLARY IMPLEMENTATION CONFIGURATION PARAMETERS

[XsdEnumerationServlet]

| | |
|---|---|
| objectFactoryNamespace | This parameter describes the namespace where the ConfigManagerSpecificationFactory will be built and used to initialize the Object Factory. (It may be a required property.) |
| dynamic-enumerator-identifier | This parameter describes the identifier used to load the DynamicEnumerator class from the ObjectFactory. (It may be a required property.) |
| context-attribute-name | This parameter describes the attribute name where the Dynamic Enumerator will be stored after being produced by the ObjectFactory. (It may be a required property.) |

[EnumerationCacheRefreshServlet]

| | |
|---|---|
| context-attribute-name | This parameter describes the attribute name where the Dynamic Enumerator will be retrieved. |

TABLE 11

EXEMPLARY IMPLEMENTATION CONFIGURATION PARAMETERS SAMPLE

```
<init-param>
    <param-name>objectFactoryNamespace</param-name>
    <param-value>DynamicEnumeratorNamespace</param-value>
</init-param>
<init-param>
    <param-name>dynamic-enumerator-identifier</param-name>
    <param-value>DynamicEnumerator</param-value>
</init-param>
<init-param>
    <param-name>context-attribute-name</param-name>
    <param-value>dynamicEnumeration_server</param-value>
</init-param>
```

The sample configuration in objectFactory namespace is shown in TABLE 12. This uses the interface provided by the objectFactory component, available from TopCoder, Inc., of Glastonbury, Conn. It should be understood that this implementation is specific to objectFactory, but that the same principles would apply with other techniques for creating and configuring objects.

TABLE 12

EXEMPLARY IMPLEMENTATION
SAMPLE CONFIGURATION IN objectFactoryNamespace

```
<!--
This exemplary xml file describes the relationship of main property:
1) DynamicEnumerator depends on DocumentConfigArray, SimpleCache and
XmlFillerBuilder
2) DocumentConfigArray depends on DocumentConfig1 and DocumentConfig2
3) DocumentConfig1 depends on simpleTypeConfigsArray1 and File
4) DocumentConfig2 depends on simpleTypeConfigsArray2 and File
5) simpleTypeConfigsArray1 depends on simpleTypeConfig1 and simpleTypeConfig2
6) simpleTypeConfigsArray2 depends on simpleTypeConfig3
7) simpleTypeConfig1 depends on DBEnumerationSource1
8) simpleTypeConfig2 depends on DBEnumerationSource2
9) simpleTypeConfig3 depends on DBEnumerationSource3
10) DBEnumerationSource1 depends on DBConnectionFactoryImpl
11) DBEnumerationSource2 depends on DBConnectionFactoryImpl
12) DBEnumerationSource3 depends on DBConnectionFactoryImpl
13) SimpleCache, XmlFillerBuilder, File, DBConnectionFactoryImpl are
independent on any property.
-->
<Config name="DynamicEnumeratorNamespace">
<!--Property for creating DynamicEnumerator-->
    <Property name="DynamicEnumerator">
        <Property name="type">
            <Value>com.topcoder.xml.xsd.dynamic.DynamicEnumerator</Value>
        </Property>
        <Property name="params">
            <!--First parameter : SimpleCache -->
            <Property name="param1">
                <Property name="name">
                    <Value>SimpleCache</Value>
                </Property>
            </Property>
            <!--Second parameter: XmlFillerBuilder-->
            <Property name="param2">
                <Property name="name">
                    <Value>XmlFillerBuilder</Value>
                </Property>
             </Property>
             <!--Third parameter : DocumentConfig Array-->
             <Property name="param3">
                 <Property name="name">
                     <Value>DocumentConfigArray</Value>
                 </Property>
             </Property>
        </Property>
    </Property>
    <!--Property for creating SimpleCache-->
    <Property name="SimpleCache">
        <Property name="type">
            <Value>com.topcoder.util.cache.SimpleCache</Value>
        </Property>
    </Property>
    <!--Property for creating XmlFillerBuilder-->
    <Property name="XmlFillerBuilder">
        <Property name="type">
<Value>com.topcoder.xml.xsd.dynamic.builder.XmlFillerBuilder</Value>
        </Property>
    </Property>
    <!--Property for creating array of DocumentConfig-->
    <Property name="DocumentConfigArray">
        <Property name="arrayType">
            <Value>com.topcoder.xml.xsd.dynamic.DocumentConfig</Value>
        </Property>
        <Property name="dimension">
            <Value>1</Value>
        </Property>
        <Property name="values">
            <Value>{DocumentConfig1, DocumentConfig2}</Value>
        </Property>
    </Property>
    <!--Property for DocumentConfig1-->
    <Property name="DocumentConfig1">
        <Property name="type">
            <Value>com.topcoder.xml.xsd.dynamic.DocumentConfig</Value>
        </Property>
        <Property name="params">
            <!--First parameter : String -->
```

TABLE 12-continued

EXEMPLARY IMPLEMENTATION
SAMPLE CONFIGURATION IN objectFactoryNamespace

```xml
            <Property name="param1">
                <Property name="type">
                    <Value>String</Value>
                </Property>
                <Property name="value">
                    <Value>/tcActiveProject</Value>
                </Property>
            </Property>
            <!--Second parameter: simpleTypeConfigs array-->
            <Property name="param2">
                <Property name="name">
                    <Value>simpleTypeConfigsArray1</Value>
                </Property>
            </Property>
            <!--Third parameter : File-->
            <Property name="param3">
                <Property name="name">
                    <Value>File</Value>
                </Property>
            </Property>
        </Property>
    </Property>
    <!--Property for DocumentConfig2-->
    <Property name="DocumentConfig2">
        <Property name="type">
            <Value>com.topcoder.xml.xsd.dynamic.DocumentConfig</Value>
        </Property>
    <Property name="params">
        <!--First parameter : String -->
        <Property name="param1">
            <Property name="type">
                <Value>String</Value>
            </Property>
            <Property name="value">
                <Value>/tcNotActiveProject</Value>
            </Property>
        </Property>
        <!--Second parameter: simpleTypeConfigs array-->
        <Property name="param2">
            <Property name="name">
                <Value>simpleTypeConfigsArray2</Value>
            </Property>
        </Property>
        <!--Third parameter : File-->
        <Property name="param3">
            <Property name="name">
                <Value>File</Value>
            </Property>
        </Property>
    </Property>
</Property>
    <!--Property for simpleTypeConfigsArray1-->
    <Property name="simpleTypeConfigsArray1">
        <Property name="arrayType">
            <Value>com.topcoder.xml.xsd.dynamic.SimpleTypeConfig</Value>
        </Property>
        <Property name="dimension">
            <Value>1</Value>
        </Property>
        <Property name="values">
            <Value>{SimpleTypeConfig1, SimpleTypeConfig2}</Value>
        </Property>
    </Property>
<!--Property for simpleTypeArray2-->
    <Property name="simpleTypeConfigsArray2">
        <Property name="arrayType">
            <Value>com.topcoder.xml.xsd.dynamic.SimpleTypeConfig</Value>
        </Property>
        <Property name="dimension">
            <Value>1</Value>
        </Property>
        <Property name="values">
            <Value>{SimpleTypeConfig3}</Value>
        </Property>
    </Property>
    <!--Property for file-->
```

TABLE 12-continued

EXEMPLARY IMPLEMENTATION
SAMPLE CONFIGURATION IN objectFactoryNamespace

```
<Property name="File">
    <Property name="type">
        <Value>java.io.File</Value>
    </Property>
    <Property name="params">
        <Property name="param1">
            <Property name="type">
                <Value>String</Value>
            </Property>
            <Property name="value">
                <Value>test_files/template/valid.txt</Value>
            </Property>
        </Property>
    </Property>
</Property>
<!--Property for SimpleTypeConfig1-->
<Property name="SimpleTypeConfig1">
    <Property name="type">
        <Value>com.topcoder.xml.xsd.dynamic.SimpleTypeConfig</Value>
    </Property>
    <Property name="params">
        <Property name="param1">
            <Property name="type">
                <Value>String</Value>
            </Property>
            <Property name="value">
                <Value>developmentActiveProjects</Value>
            </Property>
        </Property>
        <Property name="param2">
            <Property name="name">
                <Value>DBEnumerationSource1</Value>
            </Property>
        </Property>
    </Property>
</Property>
<!--Property for SimpleTypeConfig2-->
<Property name="SimpleTypeConfig2">
    <Property name="type">
        <Value>com.topcoder.xml.xsd.dynamic.SimpleTypeConfig</Value>
    </Property>
    <Property name="params">
        <Property name="param1">
            <Property name="type">
                <Value>String</Value>
            </Property>
            <Property name="value">
                <Value>designActiveProjects</Value>
            </Property>
        </Property>
        <Property name="param2">
            <Property name="name">
                <Value>DBEnumerationSource2</Value>
            </Property>
        </Property>
    </Property>
</Property>
<!--Property for SimpleTypeConfig3-->
<Property name="SimpleTypeConfig3">
    <Property name="type">
        <Value>com.topcoder.xml.xsd.dynamic.SimpleTypeConfig</Value>
    </Property>
    <Property name="params">
        <Property name="param1">
            <Property name="type">
                <Value>String</Value>
            </Property>
            <Property name="value">
                <Value>AllNotActiveProjects</Value>
            </Property>
        </Property>
        <Property name="param2">
            <Property name="name">
                <Value>DBEnumerationSource3</Value>
```

TABLE 12-continued

EXEMPLARY IMPLEMENTATION
SAMPLE CONFIGURATION IN objectFactoryNamespace

```xml
            </Property>
          </Property>
        </Property>
    </Property>
    <!--Property for DBEnumerationSource1-->
    <Property name="DBEnumerationSource1">
        <Property name="type">
<Value>com.topcoder.xml.xsd.dynamic.enumsource.DBEnumerationSource</Value>
        </Property>
        <Property name="params">
            <Property name="param1">
                <Property name="type">
                    <Value>String</Value>
                </Property>
                <Property name="value">
                    <Value>SELECT project_name FROM projects WHERE
project_type= 'development' AND active=true</Value>
                </Property>
            </Property>
            <Property name="param2">
                <Property name="name">
                    <Value>DBConnectionFactoryImpl</Value>
                </Property>
            </Property>
            <Property name="param3">
                <Property name="type">
                    <Value>String</Value>
                </Property>
                <Property name="value">
                    <Value>TestConnection</Value>
                </Property>
            </Property>
        </Property>
    </Property>
    <!--Property for DBEnumerationSource2-->
    <Property name="DBEnumerationSource2">
        <Property name="type">
<Value>com.topcoder.xml.xsd.dynamic.enumsource.DBEnumerationSource</Value>
        </Property>
        <Property name="params">
            <Property name="param1">
                <Property name="type">
                    <Value>String</Value>
                </Property>
                <Property name="value">
                    <Value>SELECT project_name FROM projects WHERE
project_type= 'design' AND active=true</Value>
                </Property>
            </Property>
            <Property name="param2">
                <Property name="name">
                    <Value>DBConnectionFactoryImpl</Value>
                </Property>
            </Property>
            <Property name="param3">
                <Property name="type">
                    <Value>String</Value>
                </Property>
                <Property name="value">
                    <Value>TestConnection</Value>
                </Property>
            </Property>
        </Property>
    </Property>
    <!--Property for DBEnumerationSource3-->
    <Property name="DBEnumerationSource3">
        <Property name="type">
<Value>com.topcoder.xml.xsd.dynamic.enumsource.DBEnumerationSource</Value>
        </Property>
        <Property name="params">
            <Property name="param1">
                <Property name="type">
                    <Value>String</Value>
                </Property>
                <Property name="value">
                    <Value>SELECT project_name FROM projects WHERE
```

TABLE 12-continued

EXEMPLARY IMPLEMENTATION
SAMPLE CONFIGURATION IN objectFactoryNamespace

```
active=false</Value>
            </Property>
        </Property>
        <Property name="param2">
            <Property name="name">
                <Value>DBConnectionFactoryImpl</Value>
            </Property>
        </Property>
        <Property name="param3">
            <Property name="type">
                <Value>String</Value>
            </Property>
            <Property name="value">
                <Value>TestConnection</Value>
            </Property>
        </Property>
    </Property>
</Property>
<!--Property for DBConnectionFactoryImpl-->
<Property name="DBConnectionFactoryImpl">
    <Property name="type">
<Value>com.topcoder.db.connectionfactory.DBConnectionFactoryImpl</Value>
    </Property>
    <Property name="params">
        <Property name="param1">
            <Property name="type">
                <Value>String</Value>
            </Property>
            <Property name="value">
                <Value>testDB</Value>
            </Property>
        </Property>
    </Property>
</Property>
</Config>
```

A demonstrative use of an exemplary implementation is shown in TABLE 13. In this demonstrative use, a schema document may be retrieved, such that with "XsdEnumerationServlet" registered at "http://www.topcoder.com/" with "/dynamic-xsd/*" as the URL pattern, accessing "http://www.topcoder.com/dynamic-xsd/tcProjects" results in the provided schema document would be made available. Likewise, to clear the cache, with EnumerationCacheRefreshServlet registered at http://www.topcoder.com/ and with "/dynamic-xsd-clear/*" as the URL pattern, accessing http://www.topcoder.com/dynamic-xsd-clear/tcProjects would result in the provided schema document being cleared.

TABLE 13

EXEMPLARY IMPLEMENTATION
DEMO USE

```
/* Sample XML template:
* <xsd:schema   xmlns:xsd="http://www.w3.org/2001/XMLSchema"
*               xmlns="http://www.topcoder.com/openProjects">
* <SimpleTypeFillerPlaceholder />
* </xsd:schema>
*/
/* The result document:
*
* <xsd:schema xmlns:xsd="http://www.w3.org/2001/XMLSchema"
7
xmlns="http://www.topcoder.com/openProjects">
*       <xsd:simpleType name="developmentProjects">
*           <xsd:restriction base="xsd:String">
*               <xsd:enumeration value="Data Migration Manager Version 2.0"/>
*               <xsd:enumeration value="Dynamic XSD Enumeration Version 1.0"/>
*               <xsd:enumeration value="JSON Object Version 1.0"/>
*               <xsd:enumeration value="null"/>
*           </xsd:restriction>
*       </xsd:simpleType>
*       <xsd:simpleType name="designProjects">
*           <xsd:restriction base="xsd:String">
*               <xsd:enumeration value="Review Score Calculator Version 1.0"/>
*               <xsd:enumeration value="Review Score Aggregator Version 1.0"/>
```

TABLE 13-continued

EXEMPLARY IMPLEMENTATION
DEMO USE

```
*              <xsd:enumeration value="Resource Management Version 1.0"/>
*          </xsd:restriction>
*      </xsd:simpleType>
* </xsd:schema>
*/
/* 1) Definition and usage of EnumerationSource */
// Definition of EnumerationSource (You can also define it with specified
column name)
String designQuery ="SELECT project_name FROM projects WHERE
project_type='design' AND active=true";
EnumerationSource designDbSource = new DBEnumerationSource(designQuery,
connFactory,
"TestConnection");
String devQuery = "SELECT project_name FROM projects WHERE
project_type='development' AND active=true";
EnumerationSource devDbSource = new DBEnumerationSource(devQuery, connFactory,
"TestConnection");
// Usage of EnumerationSource
/* in table projects :
* --------------------------------------------------------------------------
----
* project_id project_name project_type active
* 1 Data Migration Manager Version 2.0 development true
* 2 Dynamic XSD Enumeration Version 1.0 development true
* 3 JSON Object Version 1.0 development true
* 4 null development true
* 5 Form Validator 1.0 development false
* 6 Review Score Calculator Version 1.0 design true
* 7 Review Score Aggregator Version 1.0 design true
* 8 Resource Management Version 1.0 design true
* 9 Database Abstraction 1.1 design false
*--------------------------------------------------------------------------
---
*/
devDbSource.retrieveEnumeration( );
/*
* The return array contains four Strings (including String "null"):
* ---------------------------------------
* Data Migration Manager Version 2.0;
* Dynamic XSD Enumeration Version 1.0;
* JSON Object Version 1.0;
* null
* ---------------------------------------
*/
/* 2) Definition and usage of SimpleTypeConfig*/
// Define a design project enumeration(you can also define it with other
constructors.
SimpleTypeConfig designProjectConfig = new SimpleTypeConfig("designProjects",
designDbSource);
// Define a development project enumeration.
SimpleTypeConfig devProjectConfig = new
SimpleTypeConfig("developmentProjects", devDbSource);
// Usage of EnumerationSource
designProjectConfig.getName( ); // get "designProjects"
designProjectConfig.getEnumerationSource( ); // get designDbSource
designProjectConfig.getRestrictionBase( ); // get default RestrictionBase :
"xsd:String"
/* 3) Definition and usage of DocumentConfig */
SimpleTypeConfig[ ] simpleTypeConfigs = new SimpleTypeConfig[ ] {
devProjectConfig, designProjectConfig
};
// create projectDocumentConfig using template(see the template in the head of
this demo)
// (you can also define it with the other constructor)
DocumentConfig projectDocumentConfig = new DocumentConfig("tcProjects",
template,
simpleTypeConfigs);
// usage of DocumentConfig
projectDocumentConfig.getId( ); // get "tcProjects"
projectDocumentConfig.getTemplate( ); // get the template
projectDocumentConfig.getSimpleTypeConfigs( ); // get simpleTypeConfigs
/* 4) Definition and usage of XmlFillerBuilder*/
// define XmlFillerBuilder (you can also define it with the other
constructor);
XmlFillerBuilder xmlFillerBuilder = new XmlFillerBuilder( );
// the result document is in the head of this demo
```

TABLE 13-continued

EXEMPLARY IMPLEMENTATION
DEMO USE

```
xmlFillerBuilder.buildDocument(projectDocumentConfig);
/* 5) Definition and usage of DynamicEnumerator*/
// Create DynamicEnumerator and Register DocumentConfig.
//(you can also define it with other constructors)
DynamicEnumerator dynaEnum = new DynamicEnumerator( );
// usage of DynamicEnumerator
// add DocumentConfig
dynaEnum.addDocumentConfig(projectDocumentConfig);
// Generate a document as string(see the head for the result)
dynaEnum.getDocumentAsString("tcProjects");
// Generate a Document (see the head for the result)
dynaEnum.getDocument("tcProjects");
// get documentConfig(projectDocumentConfig)
dynaEnum.getDocument("tcProjects");
// Clear the Cached Document
dynaEnum.clearCachedDocument("tcProjects");
// clear all cache Document
dynaEnum.clearAllCachedDocuments( );
// remove documentConfig by id
dynaEnum.removeDocumentConfig("tcProjects");
```

It should be understood that the exemplary embodiment is only one exemplary implementation, and other implementations and variations are within the spirit and scope of the claims.

What is claimed:

1. A system for dynamic XML schema Definition (XSD) enumeration, comprising:
a processor;
a memory embedded with instructions executed by the processor, the embedded instruction comprising:
a receiver for receiving a request from a validation module for XSD file data, the XSD file data for validating XML data;
a cache determination subsystem for determining whether the requested XSD file data is contained in a cache;
a transmitter for providing the requested XSD file data from the cache to the validation module if the requested XSD file data is contained in the cache;
a database query system for using a defined database query to retrieve dynamically from a database data values stored in one or more columns of a database table if the requested XSD file data is not contained in the cache, wherein the data values stored in the one or more columns of the database table are retrieved dynamically from the database table using the defined database query are valid data values for XML data;
an XML structure generator for generating XML structures in response to the retrieved data values, wherein the XML structures enumerate the valid data values for XML data;
an XSD generator for generating XSD file data comprising the generated XML structures, wherein the XSD file data comprising the enumerated valid data values for XML data;
a caching subsystem for caching the generated XSD file data; and
wherein the transmitter provides the cached XSD file data to the validation module.

2. The system of claim 1, wherein the caching subsystem deletes the cached XSD file data following a change to the database table.

3. The system of claim 1, further comprising a configuration file specifying an XSD namespace and the defined database query.

4. The system of claim 3, wherein the XSD namespace is configurable.

5. The system of claim 1, wherein the defined database query is configurable.

6. A method for dynamic XML schema Definition (XSD) enumeration, comprising:
receiving, by a computer system, a request from a validation module for XSD file data, the XSD file data for validating markup language data;
determining, by the computer system, whether the requested XSD file data is contained in a cache;
providing the requested XSD file data from the cache to the validation module if the requested XSD file data is contained in the cache;
using a database query to dynamically retrieve from a database data values stored in one or more columns of a database table if the requested XSD file data is not contained in the cache, wherein the retrieved data values are valid values for the markup language data;
dynamically generating XSD file data comprising markup language data structures generated in response to the retrieved data values, wherein the generated markup language data structures enumerate the retrieved data values as a list of valid values for the markup language data;
caching the generated XSD file data; and
providing, by the computer system, the cached XSD file data to the validation module.

7. The method of claim 6, further comprising updating the cached XSD file data upon a change to the database table.

8. The method of claim 6, wherein the markup language data comprises XML data.

9. The method of claim 6, wherein the database comprises a structured query language (SQL) database.

10. The method of claim 6, wherein the request comprises a HTTP request.

* * * * *